(12) United States Patent
Park (10) Patent No.: US 10,499,455 B2
(45) Date of Patent: Dec. 3, 2019

(54) METHOD AND APPARATUS FOR SHARING TERRESTRIAL BROADCAST CONTENTS

(71) Applicant: Sang Il Park, Irvine, CA (US)

(72) Inventor: Sang Il Park, Irvine, CA (US)

( * ) Notice: Subject to any disclaimer, the term of this patent is extended or adjusted under 35 U.S.C. 154(b) by 262 days.

(21) Appl. No.: 15/596,753

(22) Filed: May 16, 2017

(65) Prior Publication Data

US 2018/0337742 A1 Nov. 22, 2018

(51) Int. Cl.
*H04W 84/12* (2009.01)
*H04L 29/06* (2006.01)
*H04H 20/61* (2008.01)

(52) U.S. Cl.
CPC .......... *H04W 84/12* (2013.01); *H04H 20/61* (2013.01); *H04L 65/4076* (2013.01)

(58) Field of Classification Search
CPC .... H04W 84/12; H04H 20/61; H04L 65/4076
See application file for complete search history.

(56) References Cited

U.S. PATENT DOCUMENTS

| 9,304,181 | B1 | 4/2016 | Park |
| 9,313,552 | B1 | 4/2016 | Park et al. |
| 2009/0245758 | A1* | 10/2009 | Kodama ............... H04N 5/765 386/291 |

* cited by examiner

*Primary Examiner* — Siming Liu
(74) *Attorney, Agent, or Firm* — Hauptman Ham, LLP

(57) ABSTRACT

An apparatus for sharing terrestrial broadcast contents by using a smart antenna configured to receive the terrestrial broadcast contents and to transmit received terrestrial broadcast contents to a display terminal via a wireless communication network and a display terminal configured to receive the terrestrial broadcast contents from the smart antenna and to display received terrestrial broadcast contents includes a smart antenna searching unit configured to search at least one other smart antenna connected via a network, a contents searching unit configured to search terrestrial broadcast contents receivable by the at least one other smart antenna, and a contents sharing unit configured to cause the terrestrial broadcast contents searched by the contents searching unit to be shared by at least one display terminal.

14 Claims, 7 Drawing Sheets

METHOD AND APPARATUS FOR SHARING TERRESTRIAL BROADCAST CONTENTS

BACKGROUND

1. Field

The present disclosure relates to a method and an apparatus for sharing terrestrial broadcast contents.

2. Description of the Related Art

U.S. Pat. Nos. 9,313,552 and 9,304,181 describe broadcast signal relay method and broadcast signal relay apparatus for receiving a terrestrial broadcast signal transmitted from a terrestrial broadcast station via an over-the air broadcast network with an antenna (smart antenna) and streaming the received terrestrial broadcast signal to a display terminal in a wireless manner via a wireless local area network.

The smart antenna is defined as an antenna that receives the terrestrial broadcast signal transmitted from a terrestrial broadcast station or an over-the air broadcast transmission tower via an over-the air broadcast network and streams the received terrestrial broadcast signal in a wireless manner via a wireless local area network. The smart antenna includes a built-in tuner for selecting a terrestrial broadcast channel.

As different broadcast channels are transmitted from different transmission towers that transmit terrestrial broadcast signal, even though the smart antenna is installed, reception sensitivity and image quality may be degraded if a broadcast is transmitted from a distant transmission tower.

Further, when recording a terrestrial broadcast channel while receiving and watching another terrestrial broadcast channel, the smart antenna needs to have a plurality of built-in tuners, which may cause problems of insufficient space in the smart antenna and increase in the price.

Moreover, when receiving a broadcast channel that is not available at the current location, it is required to use a smart antenna installed at a location where the corresponding broadcast channel is receivable.

To cope with these problems, using an idle smart antenna to share the broadcast channel can be a solution, by connecting smart antennas that are separated from each other with a network.

SUMMARY

According to some embodiments of the present invention, an apparatus for sharing terrestrial broadcast contents by using a smart antenna configured to receive the terrestrial broadcast contents and to transmit received terrestrial broadcast contents to a display terminal via a wireless communication network and a display terminal configured to receive the terrestrial broadcast contents from the smart antenna and to display received terrestrial broadcast contents includes a smart antenna searching unit configured to search at least one other smart antenna connected via a network, a contents searching unit configured to search terrestrial broadcast contents receivable by the at least one other smart antenna, and a contents sharing unit configured to cause the terrestrial broadcast contents searched by the contents searching unit to be shared by at least one display terminal.

Further, according to some embodiments of the present invention, a method of sharing terrestrial broadcast contents by using a smart antenna configured to receive the terrestrial broadcast contents and to transmit received terrestrial broadcast contents to a display terminal via a wireless communication network and a display terminal configured to receive the terrestrial broadcast contents from the smart antenna and to display received terrestrial broadcast contents includes first searching including searching at least one other smart antenna connected via a network, second searching including searching terrestrial broadcast contents receivable by the at least one other smart antenna, and causing the terrestrial broadcast contents searched at the second searching to be shared by at least one display terminal.

The above and other objects, features, advantages and technical and industrial significance of this invention will be better understood by reading the following detailed description of presently some embodiments of the invention, when considered in connection with the accompanying drawings.

DETAILED DESCRIPTION OF THE SOME EMBODIMENTS

Exemplary embodiments of the present disclosure are described in detail below with reference to the accompanying drawings. In the following descriptions, like reference numerals designate like elements although the elements are shown in different drawings. Further, detailed descriptions of known functions and configurations incorporated herein are omitted for the purpose of clarity and for brevity.

Figure 1:
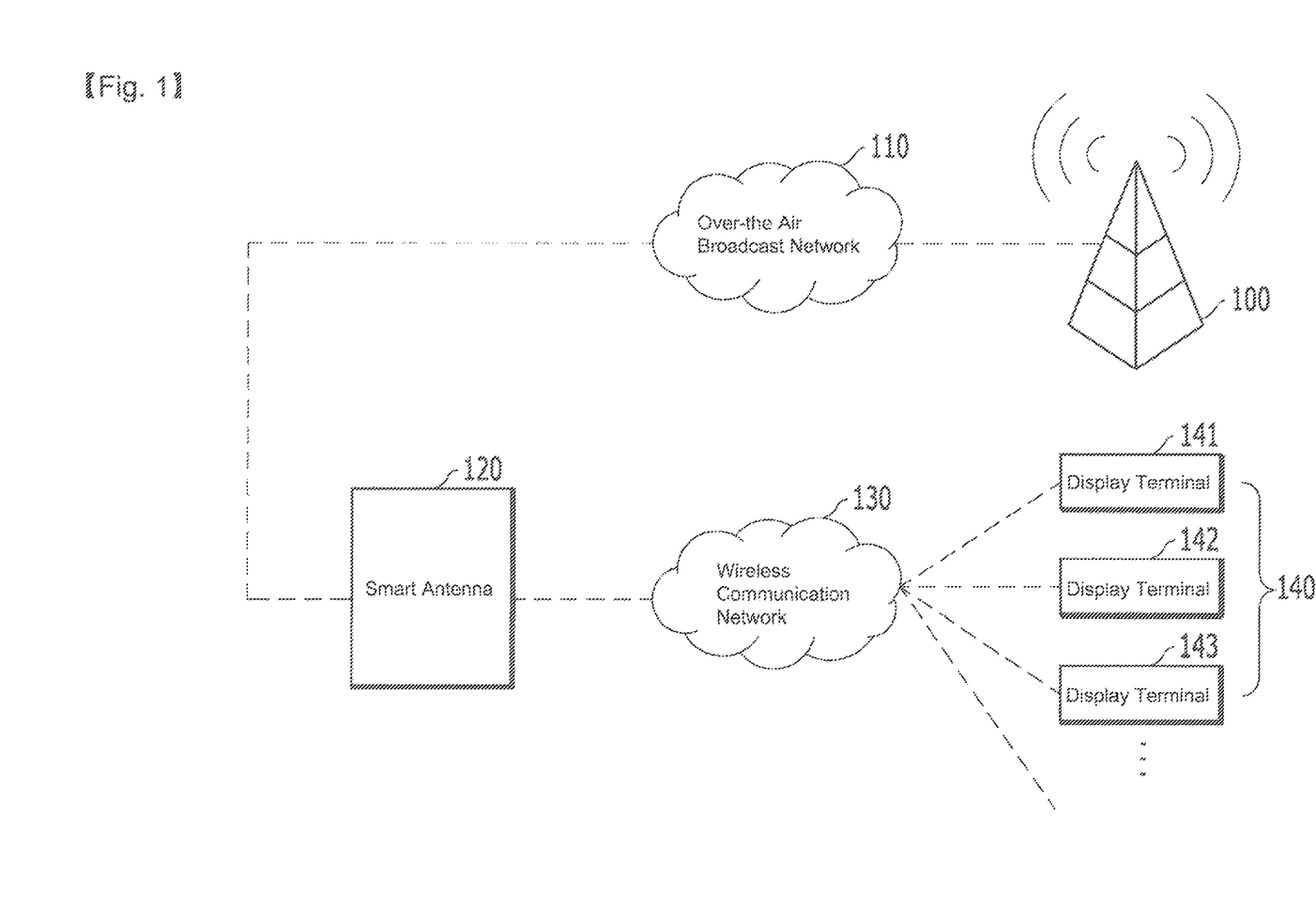
FIG. 1 is a schematic diagram of broadcast signal relay system employing a smart antenna according to at least one embodiment of the present invention.

FIG. 1 is a schematic diagram of broadcast signal relay system employing a smart antenna 120 according to at least one embodiment of the present invention.

As shown in FIG. 1, the smart antenna 120 according to at least one embodiment of the present invention is connected to a plurality of display terminals 140 located in a house via a wireless communication network 130.

The smart antenna 120 relays a terrestrial broadcast signal between a terrestrial broadcast station or an over-the air broadcast transmission tower that relays terrestrial broadcast signal from the terrestrial broadcast station (hereinafter, collectively referred to as "terrestrial broadcast station 100") and the display terminals 140. That is, the smart antenna 120 receives the terrestrial broadcast signal transmitted from the terrestrial broadcast station 100 via an over-the air broadcast network 110, and streams the received terrestrial broadcast signal to the display terminals 140 in a wireless manner via the wireless communication network 130 in real time.

Each of the display terminals 140 receives the terrestrial broadcast signal streamed by the smart antenna 120 via the wireless communication network 130, and displays the received terrestrial broadcast signal on a screen. The display terminals 140 include a terminal equipped with a storage device and a microprocessor, such as TV, desktop computer, notebook computer, workstation, palmtop computer, ultra-mobile personal computer (UMPC), tablet, personal digital assistant (PDA), webpad, smartphone, and the like.

The terrestrial broadcast station 100 broadcasts terrestrial broadcast contents or terrestrial Live TV in real time. That is, the terrestrial broadcast station 100 converts various terrestrial Live TV programs such as drama, news, movie, and the like into a terrestrial broadcast signal, and transmits the terrestrial broadcast signal via the over-the air broadcast network 110. Transmitting the terrestrial broadcast signal using a broadcast satellite (not shown) is also included in this transmission scheme.

The wireless communication network 130 is a communication network for transmitting and receiving various types of data, a near-distance wireless communication network such as WiFi network, wireless LAN, near field communication (NFC), Bluetooth™, and the like.

The smart antenna 120 streams the terrestrial broadcast signal to the display terminals 140 in a wireless manner via the wireless communication network 130. In this manner, the smart antenna 120 streams the terrestrial broadcast signal received from the terrestrial broadcast station 100 in a wireless manner to the display terminals 140 in a wireless manner without using a cable, and hence the smart antenna 120 can be installed at an optimum location with good broadcast reception sensitivity regardless of a location of the display terminals 140 such as TV.

On the other hand, when there is a wireless Internet router (not shown) in the house, the smart antenna 120 and the display terminals 140 can be connected to the wireless communication network 130 and the Internet via the wireless Internet router. The near-distance wireless communication network performs a function of a relay network for connecting the smart antenna and the display terminals to a broad area network such as the Internet, and the smart antenna and the display terminals are directly connected to the Internet via the wireless communication network or via the Internet router connected to the near-distance wireless communication network.

The smart antenna 120 according to at least one embodiment of the present invention operates with a dedicated software application installed in at least one display terminal 140. The dedicated software application provides a TV program guide and operation status information of the smart antenna 120, and is operable with another smart antenna and another dedicated software application via the Internet.

For example, when a display terminal 141 is a TV, a display terminal 142 is a smartphone, and a display terminal 143 is a tablet PC, the dedicated software application is installed in at least one of the display terminal 142 or the display terminal 143 to control the smart antenna 120 and the display terminal 141 such that the terrestrial broadcast contents received by the smart antenna 120 are streamed to the display terminal 141.

Figure 2:
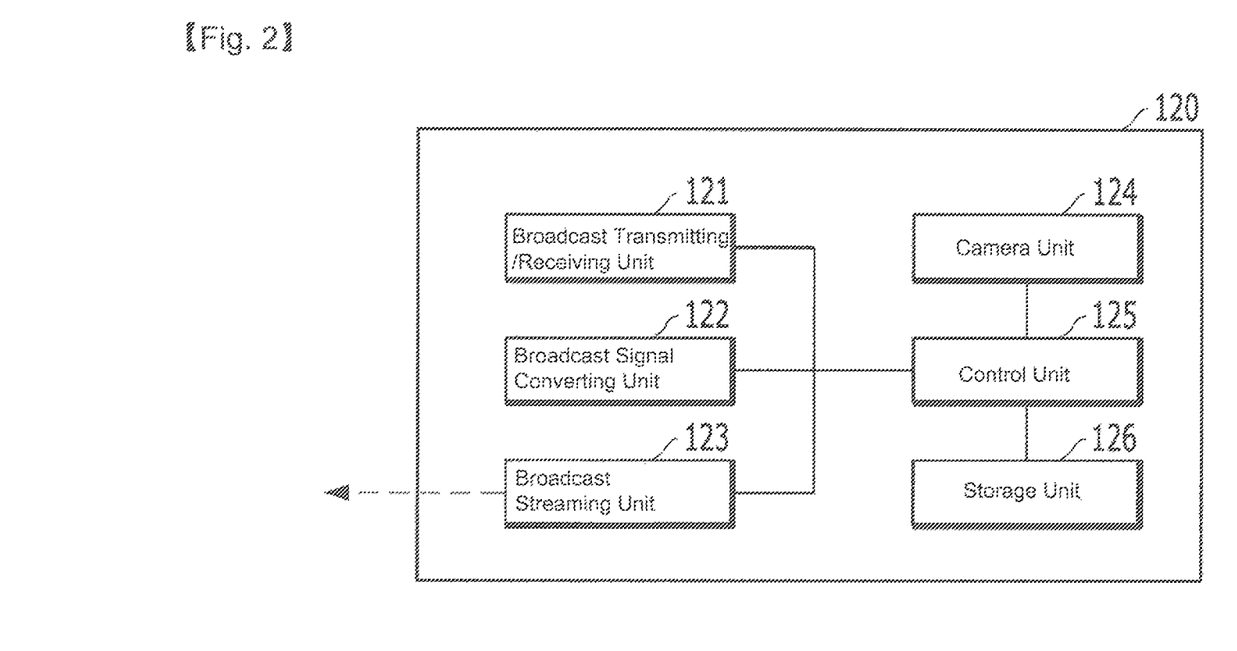
FIG. 2 is a block diagram of a smart antenna according to at least one embodiment of the present invention.

FIG. 2 is a block diagram of the smart antenna 120 according to at least one embodiment of the present invention.

As shown in FIG. 2, the smart antenna 120 according to at least one embodiment of the present invention includes a broadcast transmitting/receiving unit 121, a broadcast signal converting unit 122, a broadcast streaming unit 123, a control unit 125, and a storage unit 126.

The broadcast transmitting/receiving unit 121 receives the terrestrial broadcast signal transmitted from the terrestrial broadcast station 100 via the over-the air broadcast network 110.

The broadcast signal converting unit 122 converts the terrestrial broadcast signal received by the broadcast transmitting/receiving unit 121 into a signal of a format that can be provided to the display terminals 140 via the wireless communication network 130. That is, the broadcast signal converting unit 122 converts the terrestrial broadcast signal of a format suitable for the over-the air broadcast network 110 into a signal of a format suitable for the wireless communication network 130. For example, when the wireless communication network 130 is a WiFi network, the broadcast signal converting unit 122 converts the received terrestrial broadcast signal into a signal of a WiFi format.

The broadcast streaming unit 123 streams the terrestrial broadcast signal converted by the broadcast signal converting unit 122 to the display terminals 140 in a wireless manner via the wireless communication network 130. Each of the display terminals 140 outputs the received terrestrial broadcast signal to a screen.

In some embodiments, the broadcast streaming unit 123 streams the terrestrial broadcast signal converted by the broadcast signal converting unit 122 to each of a plurality of display terminals 141, 142, 143, . . . in a wireless manner via the wireless communication network 130.

Channels of the broadcast signals streamed to the plurality of display terminals 141, 142, 143, . . . can differ from each other. For example, when channels to be watched by users of the plurality of display terminals 141, 142, 143, . . . differ from each other, the broadcast streaming unit 123 streams broadcast signals of desired broadcast channels to the plurality of display terminals 141, 142, 143, . . . , respectively. In order for the smart antenna 120 to receive and stream a plurality of broadcast channels, the smart antenna 120 may include a plurality of tuners.

The control unit 125 controls overall operation of the smart antenna 120. That is, the control unit 125 controls operations of the broadcast transmitting/receiving unit 121, the broadcast signal converting unit 122, and the broadcast streaming unit 123, to transfer the terrestrial broadcast signal transmitted from the terrestrial broadcast station 100 to each of the display terminals 140.

The control unit 125 includes a processor such as a central processing unit (CPU) and the like, and controls the overall operation of the smart antenna 120 by using various operational units.

The storage unit 126 stores therein a broadcast program to be recorded from among the received terrestrial broadcast signal. In some embodiments, the storage unit 126 stores a broadcast program of a format converted by the broadcast signal converting unit 122. In some embodiments, the storage unit 126 stores broadcasts programs of formats including MPEG, AVI, and the like by using a general movie compression technique. The stored broadcast program is later used as a VOD.

In some embodiments, the smart antenna 120 further includes a camera unit (image capturing unit) 124. The camera unit 124 captures an image in front of the smart antenna 120. For example, the camera unit 124 captures an image of a user who operates a TV by using an imaging device (not shown).

Figure 3:
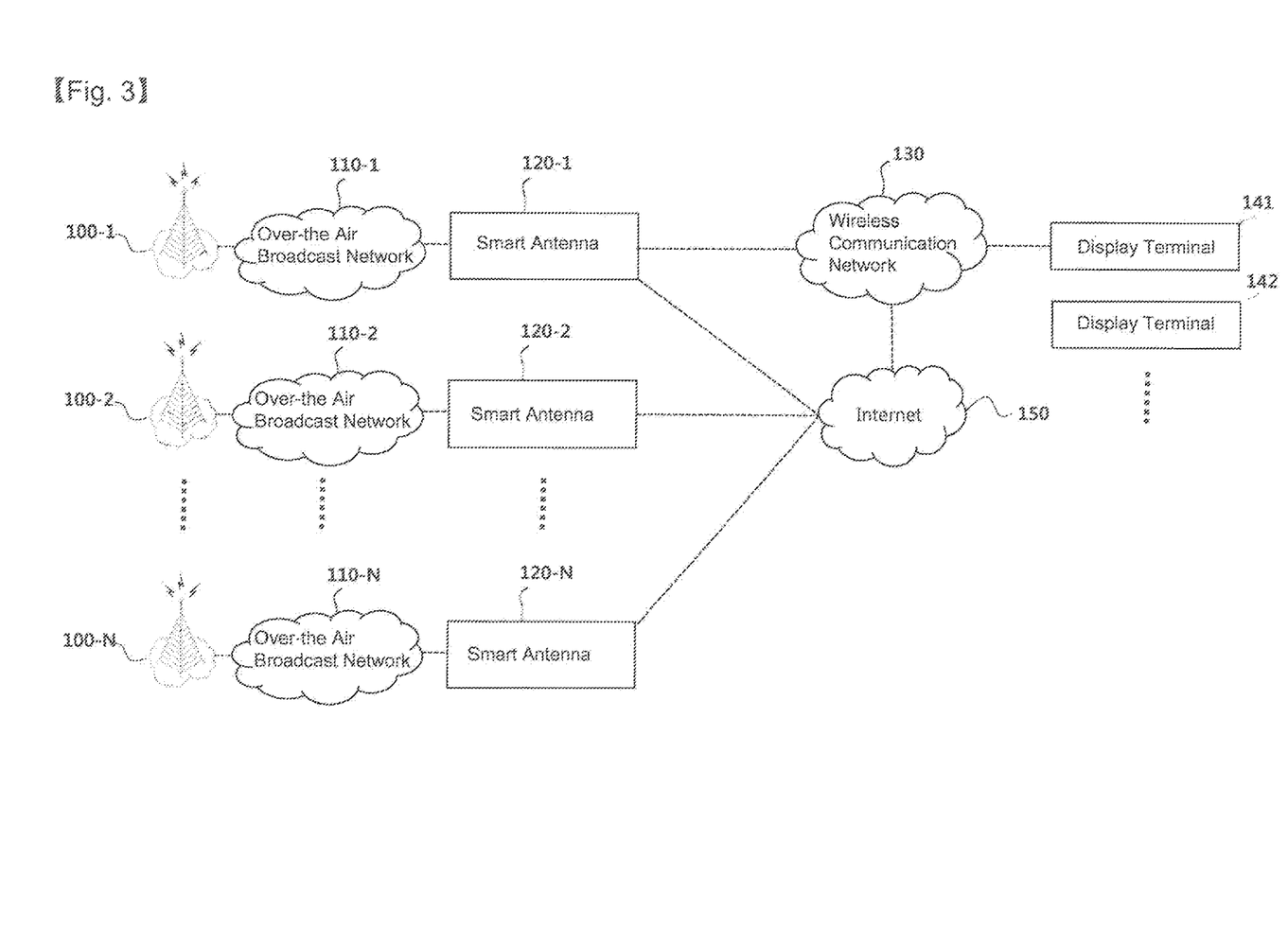
FIG. 3 is a schematic diagram of a terrestrial broadcast contents sharing system employing a smart antenna according to at least one embodiment of the present invention.

FIG. 3 is a schematic diagram of a terrestrial broadcast contents sharing system employing the smart antenna (contents sharing unit) 120 according to at least one embodiment of the present invention.

In FIG. 3, a smart antenna 120-2 located nearby such as a neighbor and a smart antenna 120-N located at distance such as a distant area, as well as a smart antenna 120-1 located in the house are connected to each other via the Internet.

When using a wireless Internet router (not shown), the smart antenna 120 and the display terminals 141 and 142 are connected to the wireless communication network 130 and the Internet via the wireless Internet router.

In this network environment, a user can connect his or her display terminals 141 and 142 not only to his or her smart antenna but also to other's smart antenna 120-2 or 120-3 by using the wireless communication network 130 or the Internet 150.

In this case, the dedicated software applications installed in the display terminals 141 and 142 can connect to the smart antenna 120-2 via the Internet to control an operation of the smart antenna 120-2, by which the smart antennas 120-1, 120-1, . . . , 120-N located at distance and the display terminals 141 and 142 can offer a person-to-person (P2P) data transmission and reception therebetween.

In some embodiments, the dedicated software applications installed in the display terminals 141 and 142 have a function of controlling operations of receiving terrestrial broadcast contents from a plurality of smart antennas 120-2, . . . , 120-N connected to each other via a network and transmitting the received terrestrial broadcast contents to at least one of the display terminals 141 and 142 connected to each other via a network, as well as a function of controlling an operation of streaming terrestrial broadcast contents between the smart antenna 120 and the display terminals 140.

In order to perform the data transmission and reception, it may be necessary to obtain a subscription of a terrestrial Live TV program providing service and an agreement in sharing the content among users who want to share the terrestrial broadcast contents, for complying to the privacy policy and the related regulations.

In FIG. 3, the smart antenna 120-1 relays the terrestrial broadcast signal between a terrestrial broadcast station 100-1 and the display terminals 141 and 142. The smart antenna 120-1 receives the terrestrial broadcast signal transmitted from the terrestrial broadcast station 100-1 via the over-the air broadcast network 110-1, and streams the received terrestrial broadcast signal to the display terminals 141 and 142 in a wireless manner via a wireless communication network 130 such as the wireless LAN.

In FIG. 3, the display terminal 142 performs a function of displaying the terrestrial broadcast contents as a main display terminal such as a TV, and the display terminal 141 performs a function of causing the terrestrial broadcast contents received from the smart antennas 120-1, 120-2, . . . , 120-N to be displayed or stored on the main display terminal, as a sub display terminal such as a tablet PC. In some embodiments, a single display terminal 141 or 142 performs functions of both the sub display terminal and the main display terminal such that the terrestrial broadcast contents received from the smart antenna 120 are displayed or stored on the display terminal 141 or 142 itself.

To this end, in some embodiments, the smart antenna 120 and the display terminals 141 and 142 respectively include dedicated software applications for the corresponding functions.

In FIG. 3, the smart antenna 120-1 and the display terminals 141 and 142 are connected to an internal wireless Internet router (not shown) via the wireless communication network 130 such as Wi-Fi, and the wireless Internet router is connectable via the Internet 150, and hence the terrestrial broadcast signal from the smart antennas 120-2 to 120-N nearby or at distance can be transmitted to the display terminals 141 and 142 via the wireless Internet router.

In FIG. 3, in some embodiments, the smart antennas 120-1, 120-2, . . . , and 120-N are located within a geographic signal transmission range of a single over-the air broadcast tower that relays terrestrial broadcast signal belonging to the same channel group. In this case, the terrestrial broadcast signal from the same transmission tower is received by the smart antennas 120-1, 120-2, . . . , and 120-N, the user of the smart antenna 120-1 can check the operation status of other terrestrial Live TV providing service subscribers' smart antennas 120-2, . . . , and 120-N by using the dedicated software application of his or her display terminal 141 or 142, thus confirming whether or not the smart antennas 120-2 to 120-N are in idle or stand-by state currently not relaying the terrestrial broadcast signal, and can receive the broadcast signal from smart antennas among the smart antennas 120-2 to 120-N, which are in the idle or stand-by state.

Technically, it is possible to check the operation state among all the terrestrial Live TV providing service subscribers having the smart antenna connectable via the Internet, however, it is practical to limit the searchable range of the smart antenna within a predetermined community by forming at least one community with predetermined users. Further, in some embodiments, the searchable range of the smart antenna is limited within users belonging to a geographic range with no time difference or within users of smart antennas located in a geographic signal transmission range of at least one over-the air broadcast tower that relays terrestrial broadcast signal belonging to the same channel group. In any case, a process of permitting the sharing of the terrestrial broadcast contents should be performed in real time or in advance among the users.

Figure 4:
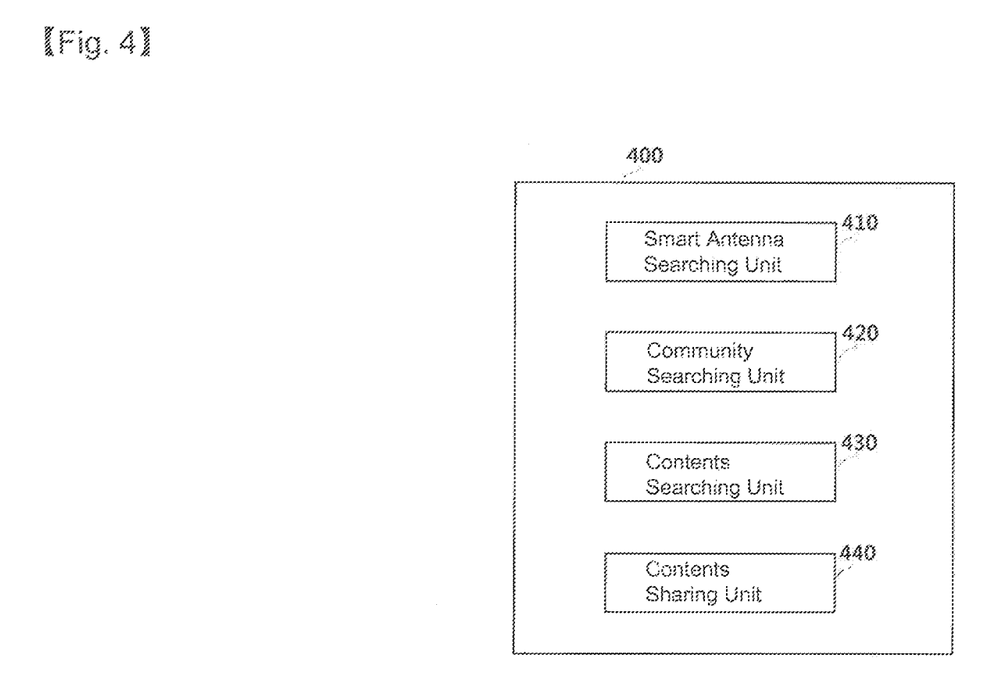
FIG. 4 is a block diagram of a terrestrial broadcast contents sharing unit according to at least one embodiment of the present invention.

FIG. 4 is a block diagram of a terrestrial broadcast contents sharing unit (contents sharing unit) 400 according to at least one embodiment of the present invention.

The contents sharing unit 400 can be implemented as a program module in the control unit 125 of the smart antenna 120 or as a program module included in the dedicated software application of the display terminal 140, 141, or 142.

As shown in FIG. 4, the contents sharing unit 400 according to at least one embodiment of the present invention includes a smart antenna searching unit 410, a community searching unit 420, a contents searching unit 430, and a contents sharing unit 440.

The smart antenna searching unit 410 of the contents sharing unit 400 searches the smart antennas 120-1, 120-2, . . . , and 120-N nearby or at distance via the wireless communication network 130 and the Internet 150, searches broadcast channels received or receivable by each of the smart antennas, and displays the searched broadcast channels.

The community searching unit 420 searches subscribers of a community to which the user belongs among the terrestrial Live TV providing service subscribers, displays the searched subscribers, and provides a community subscriber list to the smart antenna searching unit 410. The smart antenna searching unit 410 then searches smart antennas of the subscribers in the community subscriber list, searches broadcast channels received or receivable by each of the smart antennas, and displays the searched broadcast channels.

The contents searching unit 430 searches contents of the broadcast channels searched by the smart antenna searching unit 410, and displays the searched contents. When a TV program guide is provided from the storage unit 126, the contents searching unit 430 searches currently broadcasting contents or timer recordable contents based on the TV program guide, and displays the searched contents.

Figure 5:
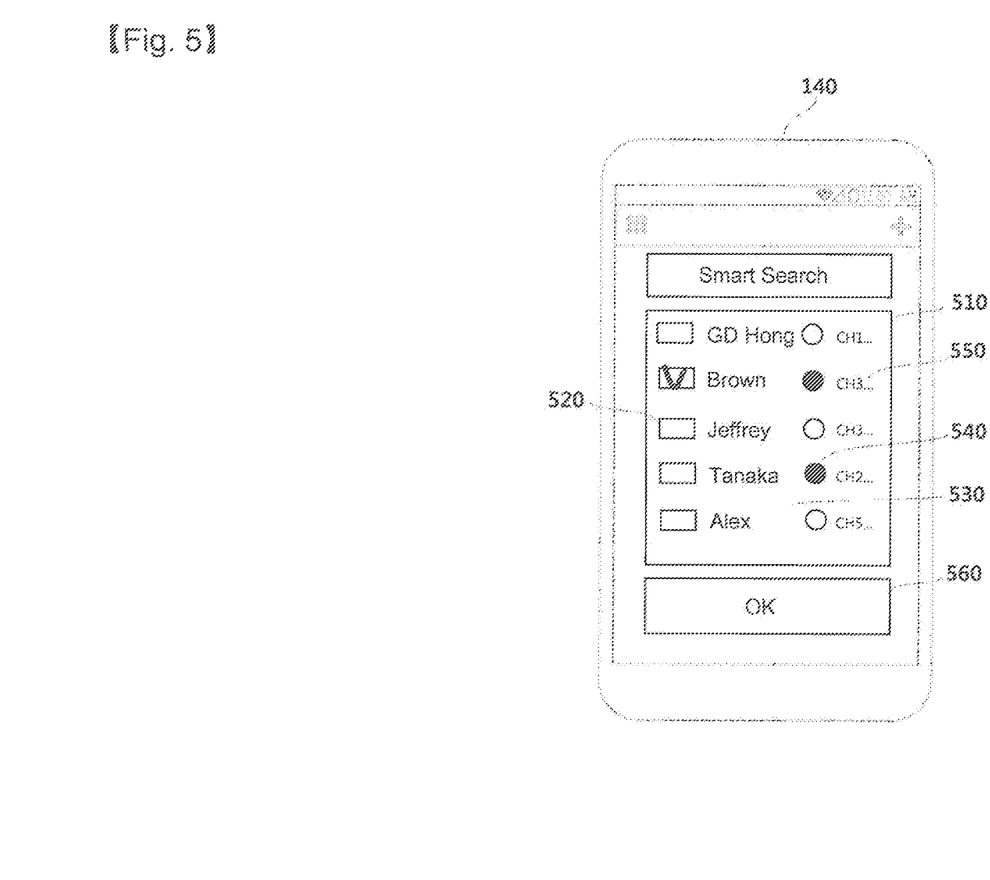
FIG. 5 is a schematic diagram for illustrating a process of sharing contents at a display terminal according to at least one embodiment of the present invention.

The information searched by the smart antenna searching unit 410, the community searching unit 420, and the contents searching unit 430 is displayed on the display terminals of the user, and such a progress is shown in FIG. 5.

Figure 6:
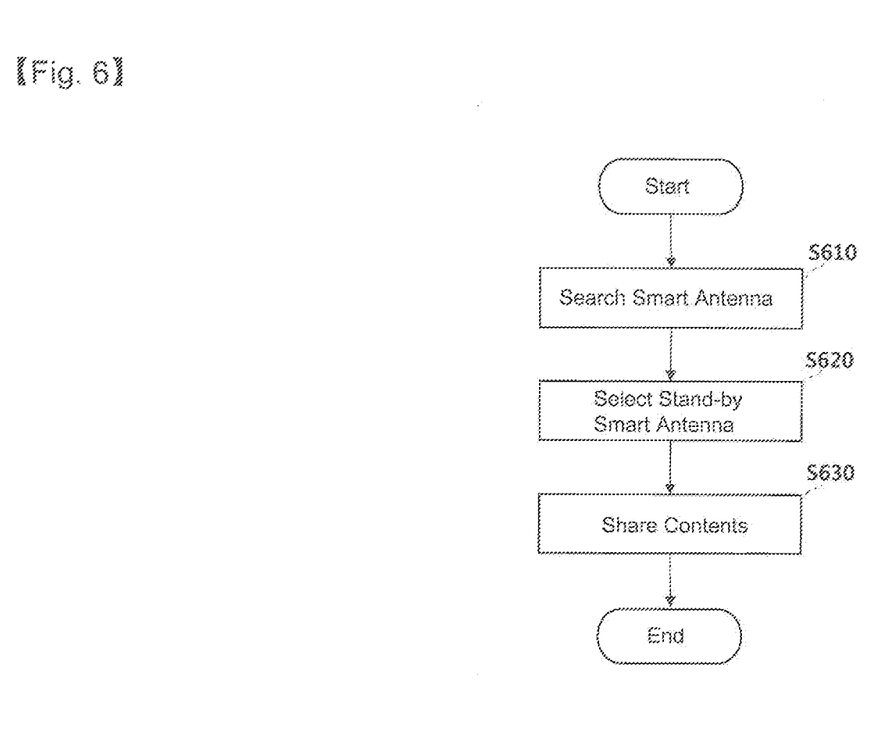
FIG. 6 is a flowchart of a process of sharing contents at a display terminal according to one embodiment of the present invention.

FIG. 5 is a schematic diagram for illustrating a process of sharing contents at a display terminal, and FIG. 6 is a flowchart of a process of sharing contents at the display terminal according to one embodiment of the present invention.

Upon beginning a smart search operation for searching smart antennas, the contents sharing unit 400 searches smart antennas of others connected via the network (Step S610), and when a smart antenna that provides desired broadcast channel and contents is selected, the search result is displayed as shown in FIG. 5.

The user interface shown in FIG. 5 displays a result of searching subscribers of a community to which the user belongs by the community searching unit 420, searching smart antennas of the subscribers of the community by the smart antenna searching unit 410, and searching contents of broadcast channels that can be received at the smart antennas by the contents searching unit 430.

A user interface 510 of the display terminal 140 in a contents sharing mode displays a checkbox 520 for indicating a user select, a user ID 530, a contents sharing status 540, a contents sharing channel 550, and an enter button 560 for confirming the user select. The user interface 510 shown in FIG. 5 is a mere example in some embodiments of the present invention, and hence the contents sharing mode interface can be modified differently from the interface shown in FIG. 5. For example, when a mode allows the user to touch the user ID 530 to select the contents sharing channel 550, the checkbox 520 and the enter button 560 can be eliminated.

The contents sharing status 540 displays a case where the smart antenna is activated to receive the current broadcast channel and a case where the smart antenna is in a stand-by mode without receiving the current broadcast channel differently from each other. The contents sharing channel 550 displays broadcast channel(s) that can be received by the smart antenna. When the smart antenna is activated, a broadcast channel being received is displayed; however, when the smart antenna is in the stand-by mode, broadcast channels or a list of broadcast channels that can be received by the smart antenna can be displayed. When a receivable broadcast channel list for each time window is provided, the user can check contents provided at each broadcast channel for each time window.

When the user selects a smart antenna and a broadcast channel and/or contents from among the smart antennas in the stand-by mode via the user interface 510 (Step S620), the contents being broadcasted at the corresponding channel of the selected smart antenna are transmitted to the user display terminal via the local area network and the Internet, thus establishing the contents sharing (Step S630).

Figure 7:
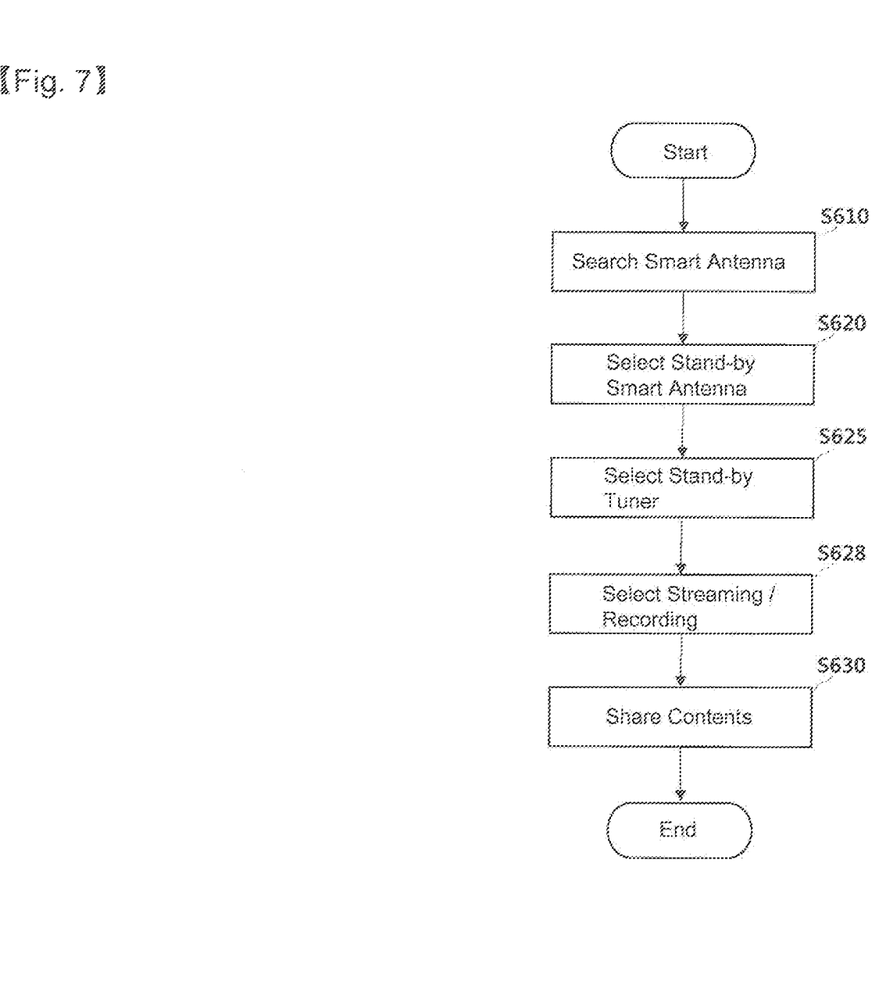
FIG. 7 is a flowchart of a process of sharing contents at a display terminal according to another embodiment of the present invention.

FIG. 7 is a flowchart of a process of sharing contents at a display terminal according to another embodiment of the present invention.

When the smart antenna includes a plurality of tuners to simultaneously receive a plurality of channels, if at least one tuner is in the stand-by mode, the smart antenna can be displayed as being in the stand-by mode. Therefore, although a tuner that is currently receiving a broadcast channel cannot be used in the contents sharing, the other tuners in the stand-by mode can be used in the contents sharing with others.

In this case, the user first searches smart antennas (Step S610), selects a smart antenna in the stand-by mode (Step S620), and selects a tuner in the stand-by mode among the plurality of tuners of the smart antenna (Step S625). When selecting a tuner, the user can check the broadcast channels and contents that can be received by the corresponding tuner.

When the contents to be shared are selected, the user selects a sharing mode between broadcast streaming and broadcast recording (Step S628), and when either the streaming or the recording is selected as the sharing mode, the contents sharing is established in the selected sharing mode (Step S630). In the broadcast streaming mode, the broadcast is received and displayed on a display terminal in real time, and in the broadcast recording mode, the contents of the broadcast channel are received in real time and the contents of the corresponding broadcast channel are stored in a storage device.

The storage device includes a storage device included in the user's display terminal or smart antenna, an external storage device connected to the display terminal or the smart antenna, and a web-hard type or cloud-type storage device connected to the display terminal or the smart antenna via a network.

The user of the smart antenna can search smart antennas of others and record contents of different channels in the storage device while watching a broadcast channel. In this case, the broadcast recording is not necessarily to be a real-time recording, but can be a timer recording. To this end, the user interface needs to allow a user to select a smart antenna that is currently receiving a broadcast but will be in the stand-by mode in a specific time window as a selectable smart antenna.

Although it is not shown in the drawings, in some embodiments, the contents sharing unit 400 is free of the community searching unit 420, and in this case, the smart antenna searching unit 410 searches all technically searchable smart antennas, and hence the user needs to obtain an agreement on the contents sharing from the owner of the smart antenna having the contents to be shared before actually sharing the contents. It is desirable to perform the contents sharing only when the contents sharing is permitted by the contents holder in some cases.

It is an object of the present invention to utilize idle smart antenna resources by sharing the terrestrial broadcast contents that can be received by a plurality of smart antennas connected to each other via a network.

Further, it is another object of the present invention to provide a method and an apparatus for receiving the terrestrial broadcast contents with a smart antenna selected, which provides good reception sensitivity, by sharing the terrestrial broadcast contents that can be received by a plurality of smart antennas connected to each other via a network.

Moreover, it is still another object of the present invention to provide a method and an apparatus for recording a terrestrial broadcast contents while receiving another terrestrial broadcast contents by sharing the terrestrial broadcast contents that can be received by a plurality of smart antennas connected to each other via a network.

Further, it is still another object of the present invention to provide a method and an apparatus for receiving contents of a broadcast channel that are not receivable at the current location can be received by sharing the terrestrial broadcast contents that can be received by a plurality of smart antennas connected to each other via a network.

As described above, according to at least one embodiment of the present invention, idle smart antenna resources can be utilized by sharing the terrestrial broadcast contents that can be received by a plurality of smart antennas connected to each other via a network.

Further, according to at least one embodiment of the present invention, it is possible to receive the terrestrial broadcast contents with a smart antenna selected, which provides good reception sensitivity, by sharing the terrestrial broadcast contents that can be received by a plurality of smart antennas connected to each other via a network.

Moreover, according to at least one embodiment of the present invention, it is possible to record a terrestrial broadcast contents while receiving another terrestrial broadcast contents by sharing the terrestrial broadcast contents that can be received by a plurality of smart antennas connected to each other via a network.

Further, according to at least one embodiment of the present invention, contents of a broadcast channel that are not receivable at the current location can be received by sharing the terrestrial broadcast contents that can be received by a plurality of smart antennas connected to each other via a network.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A method of sharing terrestrial broadcast contents by using a smart antenna configured to receive the terrestrial broadcast contents and to transmit received terrestrial broadcast contents to a display terminal via a wireless communication network and a display terminal configured to receive the terrestrial broadcast contents from the smart antenna and to display received terrestrial broadcast contents, the method comprising:
   first searching including searching at least one other smart antenna connected via a network;
   second searching including searching terrestrial broadcast contents receivable by the at least one other smart antenna; and
   causing the terrestrial broadcast contents searched at the second searching to be shared by at least one display terminal.

2. The method according to claim 1, wherein the first searching includes searching at least one other smart antenna that is in a stand-by mode.

3. The method according to claim 2, wherein the second searching includes searching the terrestrial broadcast contents receivable by the at least one other smart antenna that is in the stand-by mode.

4. The method according to claim 1, wherein
   the first searching includes displaying contents sharing status indicating whether or not the contents are shareable with others with respect to all searched smart antennas, and
   the second searching includes displaying a contents list that can be shared at the smart antenna with the contents sharing status shareable from among the searched smart antennas.

5. The method according to claim 4, wherein the second searching includes displaying a broadcast channel list for each time window at the smart antenna with the contents sharing status shareable.

6. The method according to claim 5, wherein the causing includes
   receiving currently shareable contents from the smart antenna with the content sharing status shareable in real time; and
   displaying received contents on the at least one display terminal.

7. The method according to claim 5, wherein the causing includes
   receiving currently shareable contents from the smart antenna with the content sharing status shareable in real time; and
   storing received contents in the at least one display terminal.

8. The method according to claim 5, wherein the causing includes
   selecting later shareable contents from the smart antenna with the content sharing status shareable; and
   storing selected contents in the at least one display terminal at a shareable time.

9. The method according to claim 1, wherein the causing includes receiving contents receivable by the smart antenna from the at least one other smart antenna having better reception sensitivity than the smart antenna.

10. The method according to claim 1, wherein the causing includes sharing, from the at least one other smart antenna, contents that is receivable by the smart antenna but is not currently being received.

11. The method according to claim 1, wherein the causing includes sharing, from the at least one other smart antenna, contents that is not receivable by the smart antenna.

12. The method according to claim 1, wherein the first searching, the second searching, and the causing are performed among users who agree to share the terrestrial broadcast contents.

13. The method according to claim 1, wherein the first searching, the second searching, and the causing are performed among users of smart antennas within a geographic range with no time difference.

14. The method according to claim 1, wherein the first searching, the second searching, and the causing are performed among users of smart antennas within a geographic signal transmission range of at least one over-the air broadcast transmission tower relaying terrestrial broadcast contents belonging to a same channel group.

* * * * *